United States Patent [19]
Brown, Jr. et al.

[11] Patent Number: 5,357,589
[45] Date of Patent: Oct. 18, 1994

[54] MULTI-BRANCH DIGITAL OPTICAL SWITCH

[75] Inventors: James C. Brown, Jr., Brooklyn Center; Sarat K. Mohapatra, Woodbury; William C. Tait, Oak Park Heights, all of Minn.

[73] Assignee: Minnesota Mining and Manufacturing Company, St. Paul, Minn.

[21] Appl. No.: 180,697

[22] Filed: Jan. 13, 1994

Related U.S. Application Data

[63] Continuation of Ser. No. 905,035, Jun. 26, 1992, abandoned.

[51] Int. Cl.$^5$ .............................................. G02B 6/26
[52] U.S. Cl. ........................................ 385/16; 385/14; 385/15
[58] Field of Search ................. 385/15, 16, 17, 18, 385/22, 14, 130

[56] References Cited

U.S. PATENT DOCUMENTS

| | | | |
|---|---|---|---|
| 3,883,220 | 5/1975 | Taylor | 385/16 |
| 4,070,092 | 1/1978 | Burns | 385/17 |
| 4,400,052 | 8/1983 | Alferness et al. | 385/13 |
| 4,775,207 | 10/1988 | Silberberg | 385/2 |
| 4,778,235 | 10/1988 | Fujiwara | 385/16 |
| 4,813,757 | 3/1989 | Sakano et al. | 385/2 |
| 4,842,368 | 6/1989 | Darcie et al. | 385/17 |
| 5,033,811 | 7/1991 | Yanagawa et al. | 385/16 |
| 5,148,505 | 9/1992 | Yanagawa et al. | 385/16 |

FOREIGN PATENT DOCUMENTS

WO89/06813  7/1989  PCT Int'l Appl. .

OTHER PUBLICATIONS

"Multichannel waveguide junctions for guided-wave optics," Kapon et al., *Appl. Phys. Lett.*, American Institute of Physics, vol. 50, No. 24, 15 Jun. 1987, pp. 1710–1712.

"Analysis of Mode Separation in Multichannel Branching Waveguides," Thurston et al., *IEEE Journal of Quantum Electronics*, vol. QE–23, No. 8, Aug. 1987, pp. 1245–1255.

"Mode Separation and Switching in Multichannel Branching Optical Waveguides," Thurston et al., *SPIE vol. 836 Optoelectronic Materials, Devices, Packaging, and Interconnects*, (1987), pp. 211–219, published by SPIE–The International Society for Optical Engineering.

M. Belanger & G. L. Yip, "Theoretical and Experimental Investigation of an Active Three-branch Ti:LiNbO$_3$ Optical Waveguide Switch," *Applied Optics*, vol. 28, No. 1, Jan. 1, 1989, pp. 53–59.

W. K. Burns and A. F. Milton, "Mode Conversion in Planar–Dielectric Separating Waveguides," *IEEE Journal of Quantum Electronics*, vol. QE II, No. 1, Jan. 1975, pp. 32–39.

(List continued on next page.)

Primary Examiner—John D. Lee
Assistant Examiner—Phan Thi Heartney
Attorney, Agent, or Firm—Gary L. Griswold; Walter N. Kirn; Eric D. Levinson

[57] ABSTRACT

A multi-branch digital optical switch having three branch waveguides through which light may exit. The multi-branch digital optical switch includes a main waveguide, two side branch waveguides, and one center branch waveguide. The two side branch waveguides diverge symmetrically from the center branch waveguide at angles which are sufficiently small to allow modal evolution through the switch to be substantially adiabatic. Electric fields are used to raise the index of refraction of one side branch waveguide above the index of the center branch waveguide and to lower the index of refraction of the other side branch below the index of the center branch waveguide. The switch has an extinction ratio of 700:1 (28 dB) between its two side branches.

9 Claims, 1 Drawing Sheet

OTHER PUBLICATIONS

M. D. Feit and J. A. Fleck, Jr., "Light propagation in Graded-Index Optical Fibers," *Applied Optics,* vol. 17, No. 24, Dec. 15, 1978, pp. 3990–3998.

N. Goto, M. A. Sekerka-Bajbus, and G. L. Yip, "BPM Analysis of Y-Branch TE-TM Mode Splitter in $LiNO_3$ by Proton-Exchange and Ti-Diffusion," *Electronic Letters,* vol. 25, No. 25, Dec. 7, 1989, pp. 1732–1734.

K. Mitsunaga, K. Murakami, M. Masuda, and J. Koyama, "Optical $LiNbO_3$ 3-branched Waveguide and its application to a 4-port Optical Switch," *Applied Optics,* vol. 19, No. 22, Nov. 15, 1980, pp. 3837–3842.

H. Okayama, T. Ushikubo and M. Kawahara, "Low Drive Voltage Y-Branch Digital Optical Switch," *Electronics Letters,* vol. 27, No. 1, Jan. 3, 1991, pp. 24–26.

M. A. Sekerka-Bajbus and G. L. Yip, "Design Optimization and Implementtion of an Optical $Ti:LiNbO_3$ 3-branch Switch by the Beam Propagation Method," *SPIE Integrated Optics and Optoelectronics,* vol. 177, (1989), pp. 216–227.

Y. Silberberg, P. Perlmutter, and J. E. Baran, "Digital Optical Switch," *Applied Physics Letters* 51 (16), Oct. 19, 1987, pp. 1230–1232.

H. Takahashi, Y. Ohmori, and M. Kawachi, "Design and Fabrication of Silica-Based Integrated-Optic $1 \times 128$ Power Splitter," *Electronic Letters,* vol. 27, No. 23, Nov. 7, 1991, pp. 2131–2133.

MULTI-BRANCH DIGITAL OPTICAL SWITCH

This is a continuation of application Ser. No. 07/905,035 filed Jun. 26, 1992, abandoned.

FIELD OF THE INVENTION

This invention relates generally to optical switches, and in particular to digital optical switches having one main waveguide that branches into at least three other waveguides.

BACKGROUND OF THE INVENTION

Optical waveguides are used to route optical power between pre-selected paths. Waveguides can be fabricated from a number of different materials including both crystalline and amorphous materials. Some of such materials exhibit an electro-optic effect wherein changes in the index of refraction occur in the presence of an electric field. A waveguide can be fabricated by growing successive crystalline layers of, for example, gallium aluminum arsenide (GaAlAs) and gallium arsenide (GaAs). Other examples of materials that are useful in fabricating waveguides are lithium niobate (LiNbO$_3$), lithium tantalate (LiTaO$_3$), zinc oxide (ZnO), and glassy polymers doped with non-linear optical moieties. The ability to alter the index of refraction with an electric field is useful for fabricating integrated optical circuits using optical switches and modulators. Optical waveguides may be used to form photonic chips which can be used in optical recording, telecommunication, computing, and imaging graphics.

Optical waveguides having one input branch and two output branches are known as Y switches. U.S. Pat. No. 3,883,220 (Taylor) discloses a Y switch that branches into two spatially separated optical paths. In the absence of an electric field, light entering the waveguide is equally split between the two paths. When an appropriate electric field is applied across one of the optical paths, the index of refraction of that path is lowered and thereby diverts or switches optical energy from that path to the other path. U.S. Pat. No. 4,070,092 (Burns) discloses a Y switch wherein the index of refraction of one arm of the Y is raised a small amount, $\Delta n$, by an electric field and the refractive index of the second arm is lowered by that same amount.

Optical waveguides having two input branches and two output branches are known as X switches. U.S. Pat. No. 4,775,207 (Silberberg) discloses an X switch which includes two convergent input and two divergent output waveguides, and electrodes for generating an electric field adjacent to the point of convergence of the output waveguides.

In an X or Y switch where both output branches have the same refractive index, optical energy entering the switch in any given local normal mode will be split equally between the output branch waveguides. However, if one of the output branches has a higher refractive index than the other branch, the lower-order local normal modes will tend to exit through the output branch waveguide that has the higher index of refraction, while the higher-order local normal modes will tend to exit through the output branch waveguide that has the lower refractive index.

A digital switch is one through which light propagates nearly adiabatically. Adiabatic propagation implies a slow enough change in waveguide parameters that optical energy entering the switch in a given local normal mode remains essentially in that mode when passing through the output branch waveguides. Thus there is no substantial mode conversion, or power transfer, between the local normal modes.

Thus, if optical energy enters the switch in the lower-order local normal mode, the light will tend to exit through the output branch waveguide that has the higher refractive index, resulting in a high extinction ratio if the propagation of the energy through the switch is substantially adiabatic. The extinction ratio is the amount of optical energy exiting one branch divided by the amount of optical energy exiting the other branch. Extinction ratios are typically expressed logarithmically in decibels (dB): 10 dB is equivalent to a ratio of 10:1, 20 dB is 100:1, and 30 dB is 1,000:1.

Essentially all of the light which enters the switch exits through one side branch or the other. "Loss" is defined as the percentage of light entering the switch that exits through the "off" branch or radiates away into the background, e.g., the substrate, etc.

Adiabatic propagation will not occur unless the angle between adjacent output branches is small. As discussed by Y. Silberberg, P. Perimutter, and J. E. Baran in their article entitled, "Digital Optical Switch," appearing in Applied Physics Letters 51 (16), Oct. 19, 1987, pp. 1230–1232, the angle should be much smaller than $\delta\beta/\gamma$, where $\delta\gamma$ is the average difference between the propagation constants of the two normal modes and $\gamma$ is their transverse propagation constant in the cladding region. Typically, $\gamma = 50\delta\beta$, which yields an angle much smaller than 0.02 radians (1.1°).

Silberberg et al. claim an extinction ratio of 20 dB at ±15 volts for an angle between side branches of 1 milliradian (0.06°). Because this angle is so small, it was necessary for Silberberg to make the switch at least 1.5 cm long in order to separate the end of the output branch waveguides far enough (15 µm) to ensure that coupling between the side branches is negligible by the time the light reaches the end of the switch. It is this separation distance of 15 µm between the branches that is critical to uncoupling the light between the branches of the switch. The length of the switch required to uncouple the light is related trigonometrically to the angle between the branches and their separation at the end of the switch. Thus, the switch of Silberberg et al. can be shortened only by increasing the angle between the branches. But as the angle is increased, the propagation becomes increasingly less adiabatic until the switch ceases to act digitally.

The angle between the side branches necessary for digital switching, i.e., adiabatic propagation, is less than 0.2° according to calculations using the Beam Propagation Method (BPM) made by K. Mitsunaga, K. Murakami, M. Masuda, and J. Koyama in their article entitled, "Optical LiNbO$_3$ 3-branched Waveguide and its Application to a 4-port Optical Switch" appearing in Vol. 19, No. 22 of Applied Optics, Nov. 15, 1980, pp. 3837–3842, (hereafter "Mitsunaga et al."). The beam propagation method (BPM) is a method for calculating the propagation of light through a waveguide when the electric field is localized. BPM is discussed in an article entitled, "Light Propagation in Graded-Index Optical Fibers," by M. D. Feit and J. A. Fleck, Jr., appearing in Applied Optics, Vol. 17, No. 24, Dec. 15, 1978, pp. 3990–3998.

Switches having three outputs (or inputs) are also known. U.S. Pat. No. 4,813,757 (Sakano) discloses a 1×3-branch switch having an angle between the center branch and each side branch of 7°, which is much too large to allow adiabatic propagation. Mitsunaga et al. disclose a 1×3-branch switch having an angle of 1° between adjacent branches, which is also too large to allow adiabatic propagation. In an article entitled, "Design Optimization and Implementation of an Optical Ti:LiNbO$_3$3-branch Switch by the Beam Propagation Method" appearing in SHE Vol. 177, Integrated Optics and Optoelectronics, pp. 216–227 (1989), M. A. Serkerka-Bajbus and G. L. Yip disclose a 1×3-branch switch having an angle between adjacent branches of 0.01 radians (0.6°), which is still too large to allow substantial adiabatic propagation.

It would be desirable to have a three-branched digital switch which allows for adiabatic propagation with an extinction ratio exceeding 20 dB(100:1) where the length of the switch is shorter than currently available digital switches for improved integration of the switches into optical circuits.

SUMMARY OF THE INVENTION

A multi-branch digital optical switch according to the present invention includes a main waveguide which branches into three additional waveguides: a center branch waveguide and two side branch waveguides. The two side branch waveguides diverge from the main branch waveguide at an angle which is sufficiently small that modal evolution in the switch is substantially adiabatic. The switch has a means for raising the index of refraction of one side branch waveguide above the index of the center branch waveguide while lowering the index of refraction of the other side branch waveguide below the index of the center branch waveguide.

In one embodiment of the present invention, the center branch waveguide extends only as far as is necessary to ensure that coupling between the side branches is negligible after the center branch waveguide is terminated.

In an alternative embodiment of the present invention, a multi-branch digital optical switch includes a main waveguide which branches into m+2 additional waveguides: two side branch waveguides and m center branch waveguides, where m is a positive integer. The two side branch waveguides diverge symmetrically from the main branch waveguide at angles which are sufficiently small that modal evolution in the switch is substantially adiabatic. The switch includes means for raising the index of refraction of one side branch waveguide by an amount An over the index of the main waveguide while lowering the index of refraction of the other side branch waveguide by an amount An below the index of the main waveguide.

BRIEF DESCRIPTION OF THE DRAWINGS

The novel features and advantages of the present invention will become more apparent to those skilled in the art upon consideration of the following detailed description which refers to the accompanying drawings wherein.

DETAILED DESCRIPTION OF THE PREFERRED EMBODIMENTS

Figure 1:
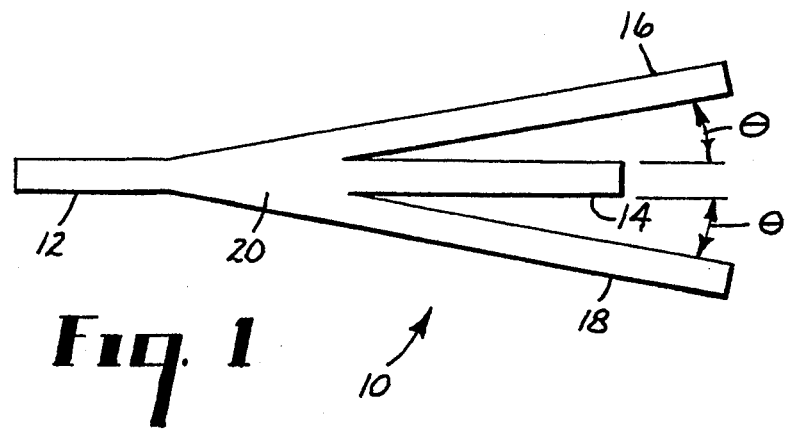
FIG. 1 is an overhead view of a 1×3-branch switch according to the present invention.

A 1×3-branch switch 10 according to the present invention is shown in FIG. 1. We have named our 1×3-branched switch a Psi ($\Psi$) switch because of its resemblance to the Greek letter $\Psi$. The $\Psi$ switch 10 includes main waveguide 12, center branch waveguide 14, and side branch waveguides 16 and 18. Center branch waveguide 14 can be the same length as side branch waveguides 16 and 18 or it can be terminated at a shorter length, as shown in FIG. 1. Side branch waveguides 16 and 18 are joined at junction 20, which also joins main waveguide 12 and center branch 14. Side branch waveguides 16 and 18 diverge symmetrically from main waveguide 12 at junction 20. Side branches 16 and 18 each diverge at an angle, $\theta$, with respect to center branch 14. (Thus, side branches 16 and 18 are separated by $2\theta$.) The angle $\theta$ between adjacent branches must be small to ensure that a light beam can propagate through switch 10 nearly adiabatically, ie., without any significant mode conversion.

Waveguides 12, 14, 16, and 18 can have the same width and index of refraction profile (ie., the same propagation constant) when they are not coupled to each other. The index of refraction of the two side branches can be altered via the electro-optic effect by a suitable arrangement of electrodes. The index of refraction can also be altered by several other means including the magneto-optic effect, the acousto-optic effect, temperature, and the injection of charge carriers.

Figure 2:
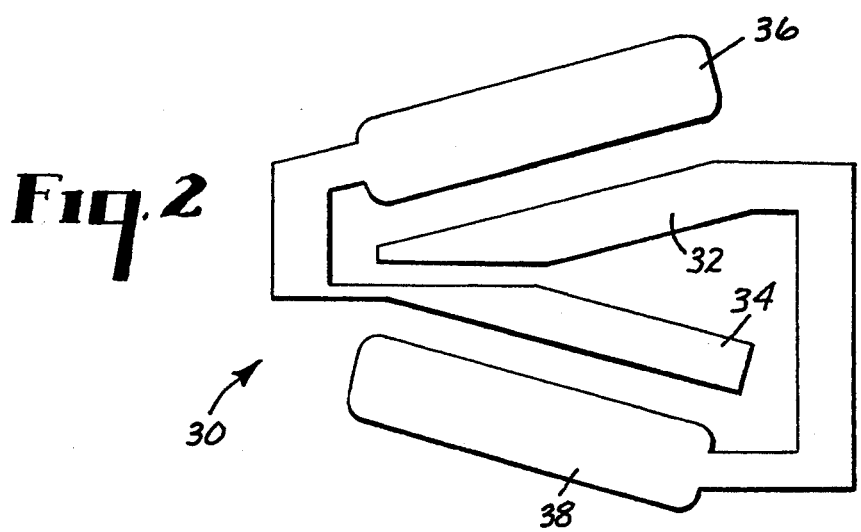
FIG. 2 is an overhead view of the electrodes used to induce an electric field in the 1×3-branch switch shown in FIG. 1.

A typical electrode arrangement 30 is shown in FIG. 2. Electrode arrangement 30 has a first pair of symmetric electrodes 32 and 34 extending along and above side branch waveguides 16 and 18. A second pair of symmetric electrodes 36 and 38 extend along the outer faces of side branch waveguides 16 and 18. Electrode 32 is electrically connected to electrode 38, and electrode 34 is electrically connected to electrode 36. A power source (not shown) creates an electrical potential difference between electrodes 32 and 36, and between electrodes 34 and 38. This in turn creates an electric field through side branch waveguides 16 and 18, which affects the refractive indices of the side branch waveguides.

Intensity/amplitude profiles were calculated by BPM for a $\Psi$ switch where the light was assumed to enter main waveguide 12 and exit through branch waveguides 14, 16, and 18. Side branches 16 and 18 each were assumed to diverge from center branch 14 at an angle $\theta$ of 2.5 milliradians (0.14°). All four waveguides were assumed to have equal propagation constants. Nearly 50% of the light was predicted to leave through center branch 14 and 25% through each side branch 16 and 18. This distribution of the output light agrees with what is expected if the modal evolution of the light as it propagates through the it switch is adiabatic.

According to one embodiment of the present invention, side branches 16 and 18 diverge from center branch 14 at an angle $\theta = 2.5$ milliradians (0.14°). The refractive index of one side branch waveguide is raised above the refractive index of the center branch waveguide, while the refractive index of the other side branch waveguide is lowered below that of center branch 14. If the refractive index of side branch 16 is made 0.0005 lower than center branch waveguide 14, and side branch 18 is made 0.0005 higher than the center branch waveguide 14, (which is attainable in LiNbO$_3$ and other electro-optic media), BPM predicts that 97% of the light entering main waveguide 12 will exit through side branch 18, about 2% will exit through center branch 14, and only 0.015% will exit through side branch 16. This yields a theoretical extinction ratio of 6500:1 (38 dB) between the two side branches of the Ψ switch and a loss of 3% from the center branch and radiation modes.

A similar calculation for a conventional Y switch, under similar conditions and having an angle $\theta$ between the side branches of 2.5 milliradians (0.14°), predicts that 94.5% of the light entering the main waveguide would exit one side branch and 4.5% would exit the other, with a loss of 1%. This yields an extinction ratio of only 21:1 (13 dB) between the branches of the Y switch. Thus, the insertion of center branch 14 creates a Ψ switch having a theoretical extinction ratio that is greater than that of the Y switch by a factor of 300:1 (25 dB).

The addition of the terminated center branch to the Y switch has the added advantage of allowing one to create a switch that is shorter than a comparably performing Y switch without any decrease in the extinction ratio. This is so because the switch must be long enough that there is substantially no coupling of light between the side branches by the time the light exits the switch. Because the length of the switch necessary to sufficiently separate the ends of the side branches is trigonometrically related to the angle $\theta$ and the separation distance 15 μm, as the angle between the side branches is decreased, the length of the switch necessary to sufficiently separate the ends of the side branches increases. For example, a non-adiabatic Y switch having an angle between its branches of 1° need be only 0.9 mm long to have an end separation of 15 μm between branches. However, if the angle is decreased to 1 milliradian (0.06°) to make the switch behave adiabatically, the switch must be 1.5 cm long to have an end separation of 15 μm.

In the switch of the present invention, however, the angle necessary to allow adiabatic propagation is determined not by the angle between the side branches but rather by the angle between adjacent branches. Accordingly, the Ψ switch of the present invention will have an extinction ratio comparable to a similar Y switch where the angle between adjacent branches in the Ψ switch equals the angle between the side branches of the Y switch. Accordingly, for a 1×3-branch switch according to the present invention, where the center branch was separated from both side branches by an angle $\theta$ of 1 milliradian (so that the angle between the two side branches was 2$\theta$, or 2 milliradians (0.12°)), the switch would have to be 7.5 mm long to have an end separation between the side branches of 15 μm. Such a switch would have an extinction ratio comparable to a Y switch which is twice as long.

We believe that the addition of the center branch to the Y switch with the stair-step arrangement of the indices of refraction in the three branch waveguides causes the modal evolution of the light as it propagates through the switch to be much more adiabatic than when the side branches alone are present. It is believed that the center branch waveguide has a key effect on the performance of the Ψ switch.

This can be understood using a simple heuristic model involving photon tunneling between potential wells. In this model, each branch waveguide in the Ψ switch represents a potential well for photons. The center branch is a dummy channel which, for a given angle between side branches, enhances the coupling between the side branches by providing an intermediate potential well that reduces the width of the barrier through which the photons must tunnel in going from one side branch to the other. This produces additional coupling between the side branches which reduces the amount of modal conversion that is occurring in the propagation, thus making the propagation more adiabatic, which in turn increases the extinction ratio for a given angle between side branches by one or more orders of magnitude over the conventional Y switch having the same angle between side branches.

Preferably, the center branch extends only as far as necessary to ensure that direct coupling between the side branches is negligible at the point that the center branch terminates. Once the center branch has been terminated, essentially all of the remaining light in the side branches will continue to be confined there with the light exiting the center branch radiating away into the background. This provides for a digital switch with low loss, a high extinction ratio and a shorter length between the input and output ends than currently available switches.

Figure 3:
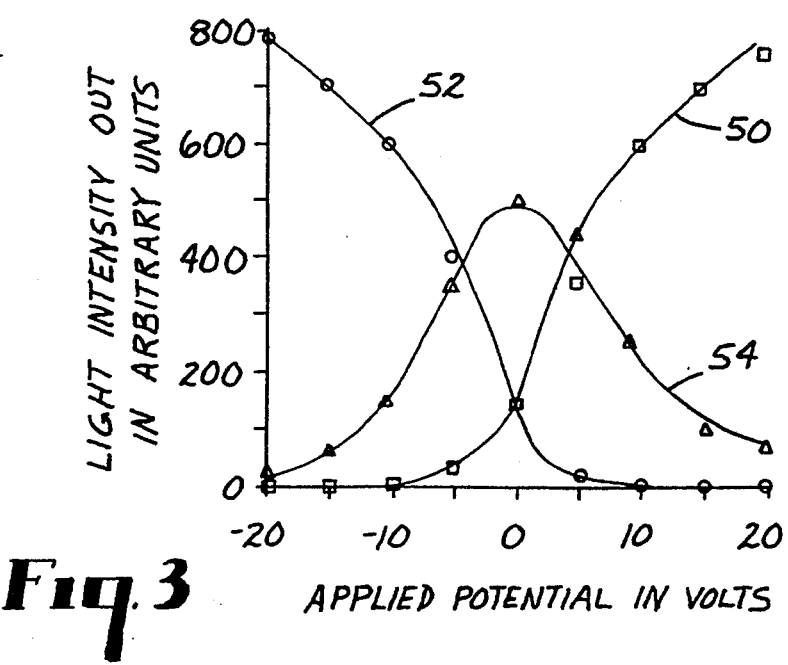
FIG. 3 shows the light emitted per branch as a function of applied voltage for the 1×3-branch switch shown in FIG. 1.

Psi switch 10 can be used to digitally switch a light beam that is incident on main waveguide 12. Light entering main waveguide 12 exits through branch waveguides 14, 16, and 18 in varying amounts as a function of the magnitude of the voltage applied by the electrodes. A graph showing the light intensity exiting each branch waveguide as a function of applied potential in volts is provided in FIG. 3.

The intensity of light exiting side branch 16 is represented by line 50, denoted by squares, the light exiting side branch 18 is represented by line 52, denoted by circles, and the light exiting center branch 14 is represented by line 54, denoted by triangles. When no voltage is applied, the majority (about 3/5) of the incident light exits center branch 14, and the remainder exits side branches 16 and 18 in equal amounts (1/5 each). As the applied voltage becomes increasingly positive, the output of side branch 18 and center branch 14 decreases, while the output of side branch 16 increases. Conversely, as the applied voltage becomes increasingly negative, the output of side branch 16 and center branch 14 decreases while the output of side branch 18 increases. We have made switches having an extinction ratio of 28 dB (700:1) for a switch where: $\theta$=2.5 milliradians (0.14°) and the refractive index of one side branch is raised by about $1.5 \times 10^{-4}$ while the index of the other branch is lowered by $1.5 \times 10^{-4}$ for an applied voltage of ±15 volts.

It is not necessary that all of the branch waveguides have the same width. For example, the loss in the switch can be reduced by making the width of the center branch waveguide smaller than the width of the side branch waveguides, thereby lowering the effective refractive index of the center branch so that fewer light rays exit through the center branch. The disadvantage of this, however, is that it results in a decrease in the switch's extinction ratio.

In an alternative embodiment of the present invention, instead of having light rays enter main waveguide 12 and exit through the center and side branch waveguides, light rays enter one of the side branch waveguides 16 or 18 and exit through main waveguide 12. Light rays which do not exit through main waveguide 12 are radiated into a substrate (not shown). For example, if the index of refraction of side branch 16 is raised above the index of center branch waveguide 14, then most of the light which is directed incident to side branch waveguide 16 will be emitted from the main waveguide. Conversely, if the index of refraction of side branch 16 is lowered below the index of center branch waveguide 14, then very little of the light directed incident to side branch waveguide 16 will be emitted from the main waveguide. The ratio of the light emitted from the main waveguide 12 when the index of refraction of the side branch 16 is raised by $1.5 \times 10^{-4}$ compared with the light emitted from the main waveguide when the index of the side branch 16 is lowered by $1.5 \times 10^{-4}$ was 700:1 (28 dB) for an applied voltage of $\pm 15$ volts.

In another alternative embodiment of the present invention (not shown), switch 10 may have one or more center branch waveguides joined at junction 20. Such a switch would have m center branch waveguides between side branch waveguides 16 and 18, where m is a positive integer. The refractive index of side branch 16 may be raised an amount $\Delta n$ over center branch waveguide 14 while the refractive index of side branch 18 is lowered by an equal amount. The refractive indices of the m center branches may be kept the same as the index of main waveguide 12 (ie., $\Delta n = 0$), or the center branches may have other indices which are between the indices of side branches 16 and 18. For example, the refractive indices of the m center branch waveguides may be arranged so that each center branch waveguide has a refractive index that differs from that of its neighboring branches by $2\Delta n/(m+1)$. Thus, for $m=1$, ie., a $\Psi$ switch, each branch waveguide differs by $2\Delta n/2 = \Delta n$; for $m=2$, i.e., $1 \times 4$-branch switch, each branch waveguide differs by $\frac{2}{3}\Delta n$; and for $m=3$, i.e., a $1 \times 5$-branch switch, each branch waveguide differs by $\frac{1}{2}\Delta n$, etc. If m is an odd integer, there will be a center branch that is centrally located between the side branches 16 and 18, and therefore the refractive index of that branch need not be changed. Thus, the refractive indices of only $m-1$ of the m center branches would have to be adjusted.

The use of additional center branches increases the extinction ratio of a switch for a given switch and allows for a reduction in the required length of the switch for a given application. The required length L of the switch decreases as a function of the number of center branches m.

The optical switches of the present invention are made by a process similar to the one described in U.S. Pat. No. 4,400,052. A substrate is selected from optically anisotropic material having two bulk refractive indices and crystallographic directions x-, y-, and z-, where the z- direction is situated in the major surface of the substrate. A preferred material for the substrate is lithium niobate (LiNbO3) but other materials may be used such as lithium tantalate (LiTaO3), Group III-V semiconductor compounds such as GaAs, ZnSe, etc., NLO polymers, MgO-doped LiNbO3, and other inorganic and organic electro-optic dielectric materials. In the case of LiNbO3, narrow and shallow waveguides are then created in the surface of the substrate by selective proton exchange using a process comprising the following steps.

First, a layer of titanium about 100 nm thick is deposited as the frontside mask metal by electron beam evaporation. Then, a layer of titanium about 70 nm thick is deposited as the backside mask metal by electron beam evaporation. Waveguide level photolithography is then performed, and the frontside and backside metal are etched for approximately 10 minutes in EDTA-based titanium etch to define the waveguide mask. A second layer of titanium about 200 nm thick is then deposited as the backside mask metal by electron beam evaporation. In all of the above steps, titanium can be replaced by aluminum or other metal alternates.

Next, the proton exchange process to define the waveguides occurs in a proton source such as a benzoic acid bath. The substrates are placed in the bath for about 30 minutes at a temperature of about 175° C. Afterwards, a layer of silicon dioxide (SiO2) about 230 nm thick is deposited by an atmospheric CVD process and annealed with the lithium niobate (LiNbO3) substrates for about $3\frac{1}{2}$ hours at 350° C.

A layer of aluminum about 250 nm thick is then deposited as the frontside electrode metal by electron beam evaporation. A layer of aluminum about 100 nm thick is then deposited as the backside electrode metal by electron beam evaporation. Aluminum may be replaced by gold or other metal alternates. Next, electrode level photolithography is performed, and the frontside and backside aluminum is wet etched for about three minutes in a phosphoric acid-based aluminum etch solution to define the electrodes.

The unmasked SiO2 is removed by PIE etching in an etch gas mixture of 15% O2 and 85% CF4 for about 90 minutes. The wafers are then diced into chips and the ends of the chips are mechanically polished. The chips may then be mounted and wire bonded for testing.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope and spirit of the invention.

We claim:
1. A multi-branch digital switch, including:
   a main waveguide, having first and second ends;
   a center branch waveguide, joined at one end to the second end of the main waveguide;
   two side branch waveguides, each joined at one end to the second end of the main waveguide; wherein each side branch waveguide diverges from the center branch waveguide at an angle sufficiently small that modal evolution in the switch is substantially adiabatic; and wherein the center branch waveguide extends only as far as is necessary to ensure that coupling between the side branch waveguides is negligible after the center branch waveguide is terminated; and
   means for raising the index of refraction of one side branch waveguide above the index of refraction of the center branch waveguide while lowering the index of refraction of the other side branch waveguide below the index of the center branch waveguide.
2. The multi-branch digital switch of claim 1 wherein the index of refraction of one side branch waveguide is raised by an amount approximately equal to the amount that the other side branch waveguide is lowered.
3. The multi-branch digital switch of claim 2 wherein the means for raising and lowering the refractive indices includes using two electric fields.

4. The multi-branch digital switch of claim 2, wherein the two side branches diverge symmetrically from the second end of the main waveguide.

5. The multi-branch digital switch of claim 1, wherein the index of refraction of the center branch waveguide is approximately equal to the index of refraction of the main waveguide.

6. The multi-branch digital switch of claim 1, wherein the switch has an extinction ratio between the side branch waveguides of at least about 700:1 for an applied voltage of 15 volts.

7. A multi-branch digital switch, including:
a main waveguide, having first and second ends;
two side branch waveguides which diverge from the second end of the main waveguide;
m center branch waveguides, where m is a positive integer, each joined at one end to the second end of the main waveguide, located between the two side branch waveguides, wherein the angle formed between each pair of adjacent branches is sufficiently small that modal evolution in the switch is substantially adiabatic, wherein at least one center branch waveguide extends only as far as necessary to ensure that coupling between the side branches is negligible after said center branch waveguide is terminated; and
means for raising the index of refraction of one side branch waveguide by an amount $\Delta n$ over the index of refraction of the main waveguide while lowering the index of refraction of the other side branch waveguide by an amount $\Delta n$ below the index of the main waveguide.

8. The multi-branch digital switch of claim 7, wherein m is an odd integer, and further including means for adjusting the refractive indices of $m-1$ of the m center branch waveguides.

9. The multi-branch digital switch of claim 7, further including means for adjusting the refractive indices of the center branch waveguides so that the refractive index of each center branch waveguide differs from the refractive index of its neighboring branches by $2\Delta n/(m+1)$.

* * * * *

UNITED STATES PATENT AND TRADEMARK OFFICE
CERTIFICATE OF CORRECTION

PATENT NO. : 5,357,589

DATED : October 18, 1994

INVENTOR(S) : Brown, Jr. et al.

It is certified that error appears in the above-indentified patent and that said Letters Patent is hereby corrected as shown below:

Column 2, line 23, "Perimutter" should read --Perlmutter--.

Column 3, line 8, "SHE" should read --SPIE--.

Column 3, line 50, "An" should read --$\Delta$n--.

Column 3, line 52, "An" should read --$\Delta$n--.

Column 4, line 56, "it" should read --$\psi$--.

Column 7, line 18, "rn" should read --m--.

Column 7, line 20, "An" should read --$\Delta$n--.

Column 7, line 27, "rn" should read --m--.

Column 7, line 39, "rn" should read --m--.

Column 8, line 26, "PIE" should read --RIE--.

Column 10, line 6, "An" should read --$\Delta$n--.

Signed and Sealed this

Twenty-first Day of March, 1995

Attest:

BRUCE LEHMAN

*Attesting Officer*     *Commissioner of Patents and Trademarks*